(12) United States Patent
Song et al.

(10) Patent No.: US 10,462,048 B2
(45) Date of Patent: Oct. 29, 2019

(54) VIRTUAL CLUSTER ESTABLISHMENT METHOD AND NETWORK DEVICE

(71) Applicant: Huawei Technologies Co., Ltd., Shenzhen, Guangdong (CN)

(72) Inventors: Xuefei Song, Beijing (CN); Xiaoqian Wu, Shenzhen (CN); Jiehui Hu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 614 days.

(21) Appl. No.: 14/711,326

(22) Filed: May 13, 2015

(65) Prior Publication Data

US 2015/0249599 A1 Sep. 3, 2015

Related U.S. Application Data

(63) Continuation of application No. PCT/CN2012/084518, filed on Nov. 13, 2012.

(51) Int. Cl.
*H04L 12/715* (2013.01)
*H04L 29/06* (2006.01)
(Continued)

(52) U.S. Cl.
CPC .............. *H04L 45/46* (2013.01); *H04L 45/02* (2013.01); *H04L 65/1073* (2013.01);
(Continued)

(58) Field of Classification Search
CPC ..... H04L 45/46; H04L 45/02; H04L 65/1073; H04L 67/10; H04L 41/0893; H04L 41/0896
(Continued)

(56) References Cited

U.S. PATENT DOCUMENTS 6,947,963 B1 * 9/2005 Agarwal ................. H04L 45/00
709/201
7,197,660 B1 * 3/2007 Liu ..................... G06F 11/2035
714/4.12
(Continued)

FOREIGN PATENT DOCUMENTS

CN 101449246 A 6/2009
CN 101931587 A 12/2010
(Continued)

OTHER PUBLICATIONS

Aggarwal, R. et al. "Request for Comments (RFC) 5331: MPLS Upstream Label Assignment and Context-Specific Label Space", Network Working Group, Aug. 2008, 13 pages. (Year: 2008).*

*Primary Examiner* — George C Neurauter, Jr.
(74) *Attorney, Agent, or Firm* — Womble Bond Dickinson (US) LLP

(57) ABSTRACT

The present invention provides a virtual cluster establishment method and a network device. The method includes: a first network device establishes, a network-layer-based first communication connection with a second network device; the first network device sends a first registration request message to the second network device through the first communication connection, where the first registration request message is used to establish a virtual cluster with the second network device; after the first network device receives a registration response message, selecting the second network device as an active main control device in the virtual cluster system; establishes, a network-layer-based second communication connection with a third network device; sends, a second registration request message to the third network device; and selects the third network device as
(Continued)

a standby main control device. In this invention, a structure of a cluster is simplified, and scalability of the cluster is improved.

15 Claims, 10 Drawing Sheets

(51) Int. Cl.
    *H04L 29/08* (2006.01)
    *H04L 12/751* (2013.01)
    *H04L 12/24* (2006.01)

(52) U.S. Cl.
    CPC .......... *H04L 67/10* (2013.01); *H04L 41/0893* (2013.01); *H04L 41/0896* (2013.01)

(58) Field of Classification Search
    USPC ........................................................ 709/226
    See application file for complete search history.

(56) References Cited

U.S. PATENT DOCUMENTS

| | | | |
|---|---|---|---|
| 7,583,665 B1* | 9/2009 | Duncan | H04Q 11/0478 370/389 |
| 7,657,628 B1* | 2/2010 | McDysan | G06F 11/2028 370/401 |
| 9,148,389 B2* | 9/2015 | Jacob Da Silva | H04L 45/58 |
| 2005/0135233 A1* | 6/2005 | May | H04L 45/00 370/216 |
| 2006/0294211 A1* | 12/2006 | Amato | H04L 45/28 709/220 |
| 2009/0052445 A1* | 2/2009 | Folkes | H04L 45/02 370/389 |
| 2009/0116514 A1* | 5/2009 | Yan | H04L 45/02 370/509 |
| 2009/0172142 A1* | 7/2009 | Hanai | G06F 15/16 709/223 |
| 2010/0054120 A1 | 3/2010 | Beeken et al. | |
| 2010/0169446 A1* | 7/2010 | Linden | G06F 11/181 709/206 |
| 2010/0189107 A1* | 7/2010 | Corson | H04L 45/02 370/392 |
| 2010/0322255 A1* | 12/2010 | Hao | G06F 9/45558 370/398 |
| 2012/0311576 A1* | 12/2012 | Shu | G06F 9/45558 718/1 |
| 2013/0046882 A1* | 2/2013 | Takashima | H04L 45/38 709/224 |
| 2013/0064137 A1* | 3/2013 | Santoso | H04L 49/70 370/254 |
| 2013/0242718 A1* | 9/2013 | Zhang | H04L 12/4633 370/218 |
| 2017/0126587 A1* | 5/2017 | Ranns | H04L 47/825 |

FOREIGN PATENT DOCUMENTS

| | | |
|---|---|---|
| CN | 102110071 A | 6/2011 |
| WO | WO 01/82678 A2 | 11/2001 |
| WO | WO 02/087172 A1 | 10/2002 |

\* cited by examiner

VIRTUAL CLUSTER ESTABLISHMENT METHOD AND NETWORK DEVICE

CROSS-REFERENCE TO RELATED APPLICATIONS

This application is a continuation of International Application No. PCT/CN2012/084518, filed on Nov. 13, 2012 which is hereby incorporated by reference in its entirety.

TECHNICAL FIELD

The present invention relates to the field of communications technologies, and in particular, to a virtual cluster establishment method and a network device.

BACKGROUND

With the rapid development of an IP network, a capacity of an IP bearer network and the number of users keep increasing rapidly, imposing a growing demand on network bandwidth. In response to the fast growing demand on the network bandwidth, a cluster router system, a switch stacking technology, or the like is used in the prior art. For example, for the cluster router system, multiple routers are connected by using a dedicated switching matrix subrack to form a routing system; and for switch stacking, multiple switches are combined and connected by using a dedicated stacking cable to form a combined device for joint working.

However, in an actual application, the foregoing cluster router or switch stacking manner has the following technical disadvantages:

Special hardware, such as a switching matrix subrack or a stacking cable, is used for connection; therefore, a cost is relatively high and a connection structure is complex. In addition, because a system connected by using the hardware generally has a fixed system scale as required by a structure of the special hardware, adaptability to a network scale change is relatively poor, that scalability of the system is poor.

SUMMARY

Embodiments of the present invention provide a virtual cluster establishment method and a network device. A virtual cluster established by using the method provided by the embodiments of the present invention is not limited to a hardware connection and has good scalability, thereby improving reliability of the virtual cluster.

According to a first aspect, a virtual cluster establishment method is provided and includes:

establishing, by a first network device, a network-layer-based first communication connection with a second network device;

sending, by the first network device, a first registration request message to the second network device through the first communication connection, where the first registration request message is used to request that the first network device and the second network device establish a virtual cluster;

after the first network device receives a first registration response message sent by the second network device, where the first registration response message indicates that the virtual cluster is successfully established, selecting the second network device as an active main control device of the first network device in the virtual cluster;

establishing, by the first network device, a network-layer-based second communication connection with a third network device;

sending, by the first network device, a second registration request message to the third network device through the second communication connection, where the second registration request message is used to request the third network device to join the virtual cluster; and after the first network device receives a second registration response message sent by the third network device, selecting the third network device as a standby main control device of the first network device in the virtual cluster.

In a first possible implementation manner of the first aspect, the first communication connection established by the first network device with the second network device passes through a fourth network device, where the fourth network device does not belong to the virtual cluster; or the second communication connection established by the first network device with the third network device passes through a fifth network device, where the fifth network device does not belong to the virtual cluster.

In the first aspect or the first possible implementation manner of the first aspect, a second possible implementation manner of the first aspect is further provided, and the selecting the second network device as an active main control device of the first network device in the virtual cluster system specifically includes: forwarding, by the first network device, a control protocol packet received from a network device outside the virtual cluster to the second network device through the first communication connection, so that the second network device generates an external forwarding entry of the virtual cluster according to the control protocol packet; and receiving, by the first network device, the external forwarding table of the virtual cluster that is sent by the second network device.

In the second possible implementation manner of the first aspect, a third possible implementation manner of the first aspect is further provided, and the second registration request message includes an address of the second network device, so that, after receiving the second registration request message, the third network device establishes a network-layer-based third communication connection with the second network device according to the address of the second network device, where the third communication connection is used to send the external forwarding table of the virtual cluster to the third network device by the second network device through the third communication connection.

In the first aspect or any one of the foregoing possible implementation manners of the first aspect, a fourth possible implementation manner of the first aspect is further provided, and the method further includes: when the first network device detects that the first communication connection to the second network device is interrupted, sending a notification message to the third network device, where the notification message is used to instruct the third network device to upgrade to the active main control device of the first network device.

In the fourth possible implementation manner of the first aspect, a fifth possible implementation manner of the first aspect is further provided, and the method further includes: receiving the external forwarding table of the virtual cluster that is sent by the third network device; upgrading, according to the external forwarding table of the virtual cluster that is sent by the third network device, an external forwarding table of the virtual cluster that is locally stored in the first network device, and deleting an external forwarding table of the virtual cluster that is locally stored and is not updated.

According to a second aspect, a virtual cluster establishment method is provided and includes:

establishing, by a second network device, a network-layer-based first communication connection with a first network device; and establishing, by the second network device, a network-layer-based third communication connection with a third network device;

receiving, by the second network device, a first registration request message that is sent through the first communication connection by the first network device; and receiving, by the second network device, a third registration request message that is sent through the third communication connection by the third network device; and establishing, by the second network device, a virtual cluster with the first network device and the third network device according to the first registration request message and the third registration request message, where the second network device is used as an active main control device of the first network device in the virtual cluster, and the third network device is used as a standby main control device of the first network device in the virtual cluster.

In a first possible implementation manner of the second aspect, the first communication connection established by the second network device with the first network device passes through a fourth network device, where the fourth network device does not belong to the virtual cluster.

In the second aspect or the first possible implementation manner of the second aspect, a second possible implementation manner of the second aspect is further provided, and that the second network device is used as an active main control device of the first network device in the virtual cluster system specifically includes: receiving, by the second network device, a control protocol packet that is sent through the first communication connection by the first network device, where the control protocol packet is received by the first network device from a network device outside the virtual cluster; and generating, by the second network device, an external forwarding table of the virtual cluster according to the control protocol packet, and sending the forwarding table to the first network device.

In the second aspect or either of the foregoing possible implementation manners of the second aspect, a third possible implementation manner of the second aspect is further provided, and the method further includes: when the first communication connection between the second network device and the first network device is interrupted, upgrading the third network device to the active main control device of the first network device in the virtual cluster.

According to a third aspect, a first network device is provided and includes:

a communication connecting unit, configured to establish a network-layer-based first communication connection with a second network device, and configured to establish a network-layer-based second communication connection with a third network device;

a message transmitting unit, configured to send a first registration request message to the second network device through the first communication connection, where the first registration request message is used to request establishment of a virtual cluster with the second network device; receive a first registration response message sent by the second network device, where the first registration response message indicates that the virtual cluster is successfully established; send a second registration request message to the third network device through the second communication connection, where the second registration request message is used to request the third network device to join the virtual cluster; and receive a second registration response message sent by the third network device; and a device determining unit, configured to: after the message transmitting unit receives the first registration response message sent by the second network device, where the first registration response message indicates that the virtual cluster is successfully established, select the second network device as an active main control device of the network device in the virtual cluster system; and after the message transmitting unit receives the second registration response message sent by the third network device, select the third network device as a standby main control device of the network device itself in the virtual cluster.

In a first possible implementation manner of the third aspect, the first communication connection established with the second network device passes through a fourth network device, where the fourth network device does not belong to the virtual cluster; or the second communication connection established with the third network device passes through a fifth network device, where the fifth network device does not belong to the virtual cluster.

In the third aspect or the first possible implementation manner of the third aspect, a second possible implementation manner of the third aspect is further provided, and the first network device further includes: a packet transmit-receive unit, configured to forward a control protocol packet received from a network device outside the virtual cluster to the second network device through the first communication connection, so that the second network device generates an external forwarding table of the virtual cluster according to the control protocol packet; and receive the external forwarding table of the virtual cluster that is sent by the second network device.

In the second possible implementation manner of the third aspect, a third possible implementation manner of the third aspect is further provided, and the second registration request message sent by the message transmitting unit to the third network device includes an address of the second network device, so that, after receiving the second registration request message, the third network device establishes a network-layer-based third communication connection with the second network device according to the address of the second network device, where the third communication connection is used to send the external forwarding table of the virtual cluster to the third network device by the second network device through the third communication connection.

In the third aspect or any one of the foregoing possible implementation manners of the third aspect, a fourth possible implementation manner of the third aspect is further provided, and the first network device further includes: the message transmitting unit, further configured to: when the first network device detects that the first communication connection to the second network device is interrupted, send a notification message to the third network device, where the notification message is used to instruct the third network device to upgrade to the active main control device of the first network device.

In the fourth possible implementation manner of the third aspect, a fifth possible implementation manner of the third aspect is further provided, and the first network device further includes: a forwarding management unit, configured to receive the external forwarding table of the virtual cluster that is sent by the third network device; update, according to the external forwarding table of the virtual cluster that is sent by the third network device, an external forwarding table of the virtual cluster that is locally stored in the first network device, and delete an external forwarding table of the virtual cluster that is locally stored and is not updated.

According to a fourth aspect, a second network device is provided and includes:

a communication connecting unit, configured to establish a network-layer-based first communication connection with a first network device, and establish a network-layer-based third communication connection with a third network device;

a message transmitting unit, configured to receive a first registration request message that is sent through the first communication connection by the first network device; and receive a third registration request message that is sent through the third communication connection by the third network device; and a cluster establishing unit, configured to establish a virtual cluster with the first network device and the third network device according to the first registration request message and the third registration request message, where the second network device is used as an active main control device of the first network device in the virtual cluster, and the third network device is used as a standby main control device of the first network device in the virtual cluster.

In a first possible implementation manner of the fourth aspect, the network-layer-based first communication connection established with the first network device passes through a fourth network device, where the fourth network device does not belong to the virtual cluster.

In the fourth aspect or the first possible implementation manner of the fourth aspect, a second possible implementation manner of the fourth aspect is further provided, and the second network device further includes: a forwarding management unit, configured to receive a control protocol packet that is sent through the first communication connection by the first network device, where the control protocol packet is received by the first network device from a network device outside the virtual cluster; and generate an external forwarding table of the virtual cluster according to the control protocol packet, and send the forwarding table to the first network device.

Technical effects of the virtual cluster establishment method and the network device provided by the present invention are: the first network device establishes a network-layer-based communication connection separately with the second network device and the third network device, and sends a registration request message based on the communication connection, so that a virtual cluster is established between the network devices, not requiring a connection by using special hardware in the prior art, thereby simplifying a structure of a cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

DETAILED DESCRIPTION

Figure 1:
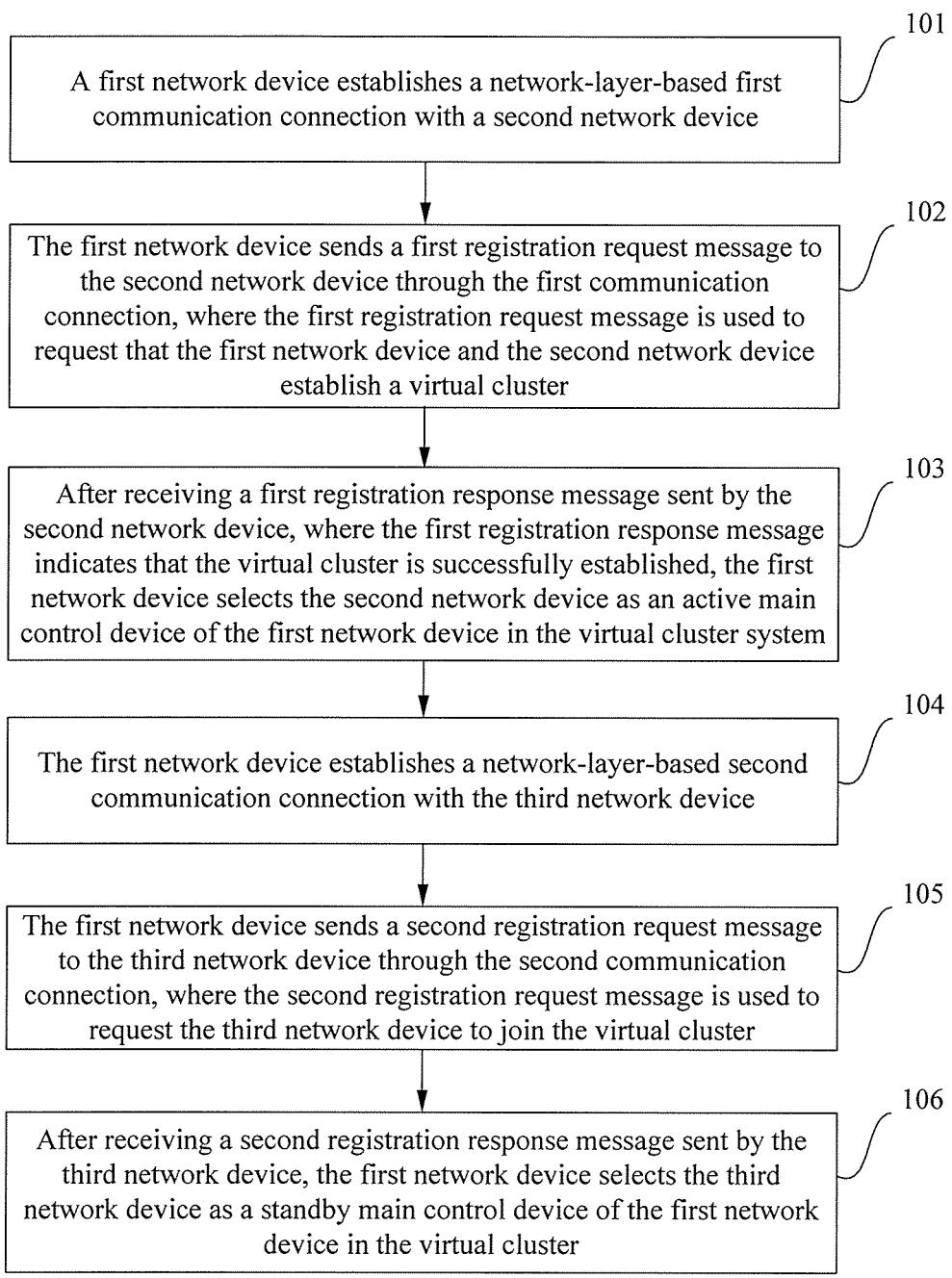
FIG. 1 is a schematic flowchart of a virtual cluster establishment method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

With the continuous development of a network technology, current network services impose an increasingly high demand on a network. To meet a requirement of service development, a series of design solutions is put forward, and a new network switching architecture, namely, a network architecture separating control from forwarding, is relatively typical. Compared with a conventional network device with a centralized architecture, separating control from forwarding is to separate a forwarding plane from a control plane on a network device and deploy the forwarding plane and the control plane on two different devices, where the two different devices work incoordination to complete forwarding of a data packet on a network. An idea of separating control from forwarding is used for a virtual cluster in the embodiments, a control plane of the virtual cluster is independent of a forwarding device and the control plane may use a group of servers to compute, in a centralized manner, a forwarding table used for packet forwarding. Compared with a control plane of an existing forwarding device, performance of the control plane has a stronger computing capability and higher reliability, and the control plane may be open to a third party, which is convenient for rapidly adding a new service. Compared with the existing forwarding device, the forwarding device has a simpler function on the control plane, and only implements local device management, which reduces a cost of the forwarding device. Between the control plane and the forwarding plane, a communication connection is established to deliver a forwarding table and report information about the forwarding device. The communication connection may be used in an in-band or out-of-band manner; therefore, a cluster is established more flexibly, and a capacity of the cluster may be dynamically modified according to an actual situation of a network. In addition, this centralized control manner also simplifies operation and maintenance of the network.

A virtual cluster establishment method described in the embodiments of the present invention includes multiple network devices, where the network devices may include an active main control device, a standby main control device, and slave node devices in a virtual cluster; the network devices may be routers, switches, or other network devices. In the virtual cluster, the slave node devices are uniformly managed by the active main control device; therefore, each slave node device needs to register with the active main control device and establish a communication connection with the active main control device. The virtual cluster establishment method in the embodiments of the present invention may be executed, regardless of a networking mode of the virtual cluster, for example, a manner of a star connection or a ring connection. The standby main control device is used as a standby device of the active main control device, and when the active main control device is faulty, the standby main control device switches to the active main control device to perform device management in the cluster. As a data forwarding node in the virtual cluster, a slave node device is used to forward, according to a forwarding table delivered by the active main control device, a data packet through a data transmission channel in a communication connection established by the virtual cluster.

Referring to FIG. 1, an embodiment of the present invention provides a virtual cluster establishment method, where the method includes the following content:

101: A first network device establishes a network-layer-based first communication connection with a second network device.

The first network device and the second network device acquire their IP addresses, where their IP addresses may be obtained by pre-configuration, or may be dynamically obtained by running the Dynamic Host Configuration Protocol DHCP).

The first communication connection may be established by using the Inter-control Center Communication Protocol (ICCP), or the Transmission Control Protocol (TCP), or the User Data gram Protocol (UDP), or the Internet Protocol (IP), and all subsequent messages sent between the first network device and the second network device are carried over the first communication connection. In specific implementation, for example, the first network device may send a request for establishing the first communication connection with the second network device according to the IP address of the second network device, perform a process of establishing the first communication connection according to a procedure specified by one of the foregoing protocols, for example, the TCP protocol, to establish the first communication connection with the second network device.

102: The first network device sends a first registration request message to the second network device through the first communication connection, where the first registration request message is used to request that the first network device and the second network device establish a virtual cluster.

In this embodiment of the present invention, after establishing the first communication connection with the second network device, the first network device sends the first registration request message to the second network device, so that the second network device manages the first network device; and the first network device establishes a virtual cluster with the second network device, where the first registration request message carries registration information of the first network device. The registration information may include: the IP address of the first network device, an Electronic Serial Number (ESN), label space, and the like.

103: After receiving a first registration response message sent by the second network device, where the first registration response message indicates that the virtual cluster is successfully established, the first network device selects the second network device as an active main control device of the first network device in the virtual cluster system.

After the first network device receives a first registration response message sent by the second network device, where the first registration response message indicates that the virtual cluster is successfully established, the second network device is used as an active main control device of the first network device in the virtual cluster, that is, a role of the second network device in the virtual cluster is determined.

After the second network device establishes the virtual cluster with the first network device, the second network device plays a role of the active main control device to manage the first network device. In addition, after being established, the virtual cluster needs to transmit various data, for example, a flow, data, or the like is transmitted through a topology path in the cluster. Therefore, to implement a function of data transmission, information included in the registration information is further used for a transmission function during subsequent cluster work. For example, the second network device may allocate a label to the first network device according to the label space in the registration information.

104: The first network device establishes a network-layer-based second communication connection with a third network device.

105: The first network device sends a second registration request message to the third network device through the second communication connection, where the second registration request message is used to request the third network device to join the virtual cluster.

106: After receiving a second registration response message sent by the third network device, the first network device selects the third network device as a standby main control device of the first network device in the virtual cluster.

In this embodiment of the present invention, the virtual cluster further includes a standby main control device (namely, the third network device), and after establishing the virtual cluster with the second network device, the first network device further establishes the second communication connection with the third network device, and requests, by sending the second registration request message, the third network device to join the virtual cluster, and the third network device is used as the standby main control device of the first network device. The second communication connection may also be established by using the ICCP, or the TCP, or the UDP, or the IP. Registration information included in the second registration request message may include: the IP address of the first network device, an ESN, label space, and the like.

Optionally, the first communication connection established by the first network device with the second network device passes through a fourth network device, where the fourth network device does not belong to the virtual cluster; or the second communication connection established by the first network device with the third network device passes through a fifth network device, where the fifth network device does not belong to the virtual cluster. The first communication connection is a network-layer-based connection, and therefore, the virtual cluster establishment method is not limited to establishing a virtual cluster between network devices that are directly connected physically, and there is no requirement on a position in which a network device is located. For example, the first network device is in Beijing, and the second network device is in Shenzhen; the first network device and the second network device may form a virtual cluster as long as the network-layer-based first communication connection can be established between the first network device and the second network device, thereby improving flexibility of virtual cluster establishment.

Optionally, that the second network device is used as an active main control device of the first network device in the virtual cluster system specifically includes that:

the first network device forwards a control protocol packet received from a network device outside the virtual cluster to the second network device through the first communication connection, so that the second network device generates an external forwarding table of the virtual cluster according to the control protocol packet; and the first network device receives the external forwarding table of the virtual cluster that is sent by the second network device.

After the first network device and the second network device establishes the virtual cluster, the virtual cluster is externally embodied as one network device, and the second network device manages the virtual cluster; the first network device sends the control protocol packet received from the network device outside the virtual cluster to the second network device, where the second network device is responsible for generating the external forwarding table of the virtual cluster, and delivering the forwarding table to the first network device, and the control protocol packet may be an Interior Gateway Protocol (IGP) packet, a Border Gateway Protocol (BGP) packet, or the like.

Optionally, the second registration request message includes the address of the second network device, so that, after receiving the second registration request message, the third network device establishes a network-layer-based third communication connection with the second network device according to the address of the second network device, where the third communication connection is used to send the external forwarding table of the virtual cluster to the third network device by the second network device through the third communication connection. In this way, the second network device may also send the external forwarding table of the virtual cluster to the third network device, so that when the second network device is faulty, and after the third network device upgrades to the active main control device of the virtual cluster, the third network device updates a forwarding table locally stored in the first network device.

Optionally, when detecting that the first communication connection to the second network device is interrupted, the first network device sends a notification message to the third network device, where the notification message is used to instruct the third network device to upgrade to the active main control device of the first network device.

Optionally, the first network device receives the external forwarding table of the virtual cluster that is sent by the third network device.

The first network device updates, according to the external forwarding table of the virtual cluster that is sent by the third network device, an external forwarding table of the virtual cluster that is locally stored in the first network device, and deletes an external forwarding table of the virtual cluster that is locally stored and is not updated.

It can be seen that, the first network device establishes a network-layer-based communication connection separately with the second network device and the third network device, and sends a registration request message based on the communication connection, so that a virtual cluster is established between the network devices, not requiring a connection by using special hardware in the prior art, thereby simplifying a structure of a cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

Figure 2:
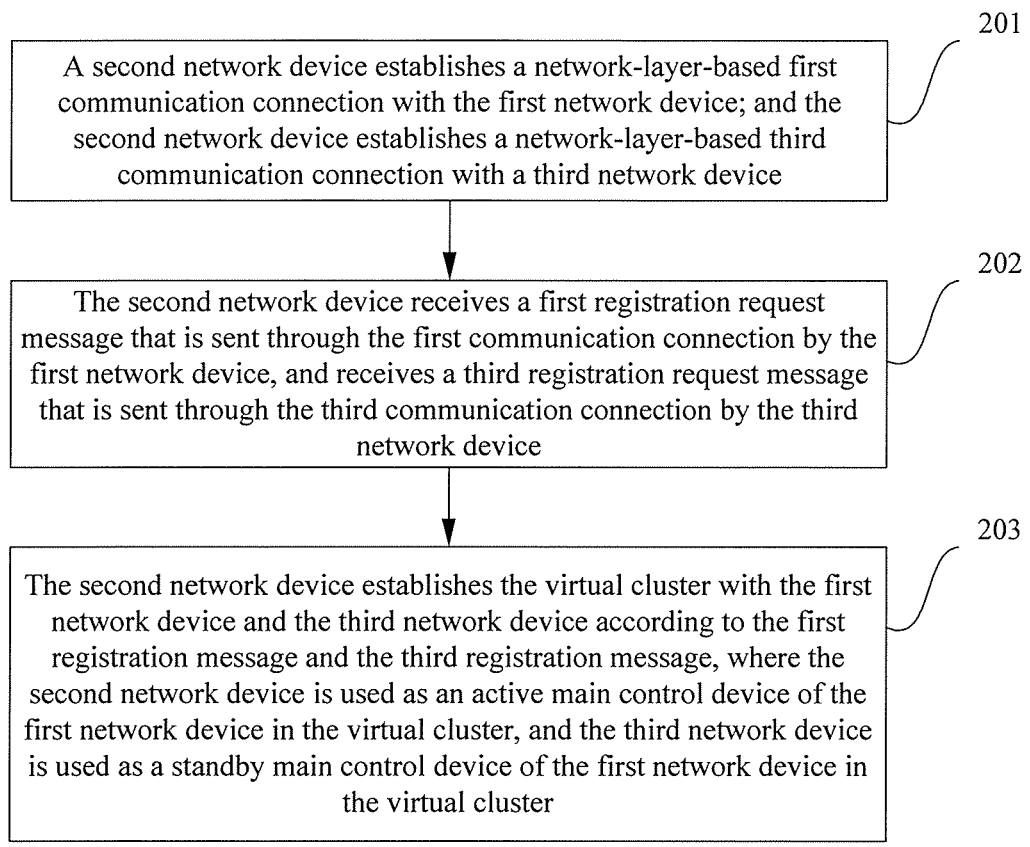
FIG. 2 is a schematic flowchart of another virtual cluster establishment method according to an embodiment of the present invention.

Referring to FIG. 2, an embodiment of the present invention provides another virtual cluster establishment method, where the method includes the following content:

201: A second network device establishes a network-layer-based first communication connection with the first network device; and the second network device establishes a network-layer-based third communication connection with a third network device.

202: The second network device receives a first registration request message that is sent through the first communication connection by the first network device, and receives a third registration request message that is sent through the third communication connection by the third network device.

203: The second network device establishes a virtual cluster with the first network device and the third network device according to the first registration request message and the third request registration message, where the second network device is used as an active main control device of the first network device in the virtual cluster, and the third network device is used as a standby main control device of the first network device in the virtual cluster.

Optionally, the first communication connection established by the second network device with the first network device passes through a fourth network device, where the fourth network device does not belong to the virtual cluster. The first communication connection is a network-layer-based connection, and therefore, the virtual cluster establishment method is not limited to establishing a virtual cluster between network devices that are directly connected physically, and there is no requirement on a position in which a network device is located. For example, the first network device is in Beijing, and the second network device is in Shenzhen; the first network device and the second network device may form a virtual cluster as long as the network-layer-based first communication connection can be established between the first network device and the second network device, thereby improving flexibility of virtual cluster establishment.

Optionally, that the second network device is used as an active main control device of the first network device in the virtual cluster system specifically includes that:

the second network device receives a control protocol packet that is sent through the first communication connection by the first network device, where the control protocol packet is received by the first network device from a network device outside the virtual cluster; and the second network device generates an external forwarding table of the virtual cluster according to the control protocol packet, and sends the forwarding table to the first network device.

Optionally, when the first communication connection between the second network device and the first network device is interrupted, the third network device upgrades to the active main control device of the first network device in the virtual cluster.

It can be seen that, the second network device establishes a network-layer-based communication connection separately with the first network device and the third network device, receives, based on the communication connection, a registration request message sent by the first network device and the third network device separately, and establishes a virtual cluster with the first network device and the third network device, not requiring a connection by using special hardware in the prior art, thereby simplifying a structure of the virtual cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

Figure 3A:
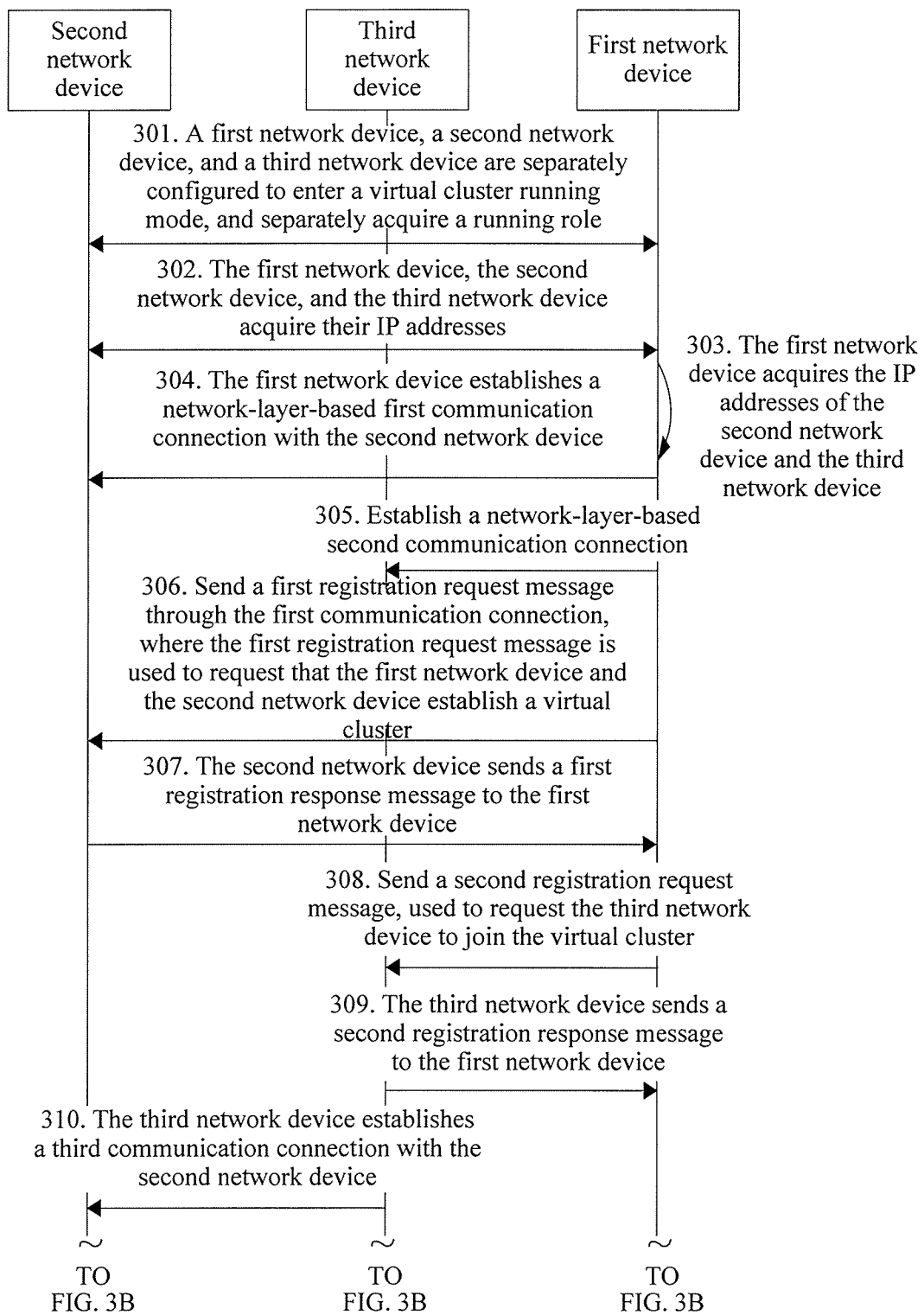
FIG. 3A and FIG. 3B are a schematic diagram of signaling interaction of a virtual cluster establishment method according to an embodiment of the present invention.
Figure 3B:
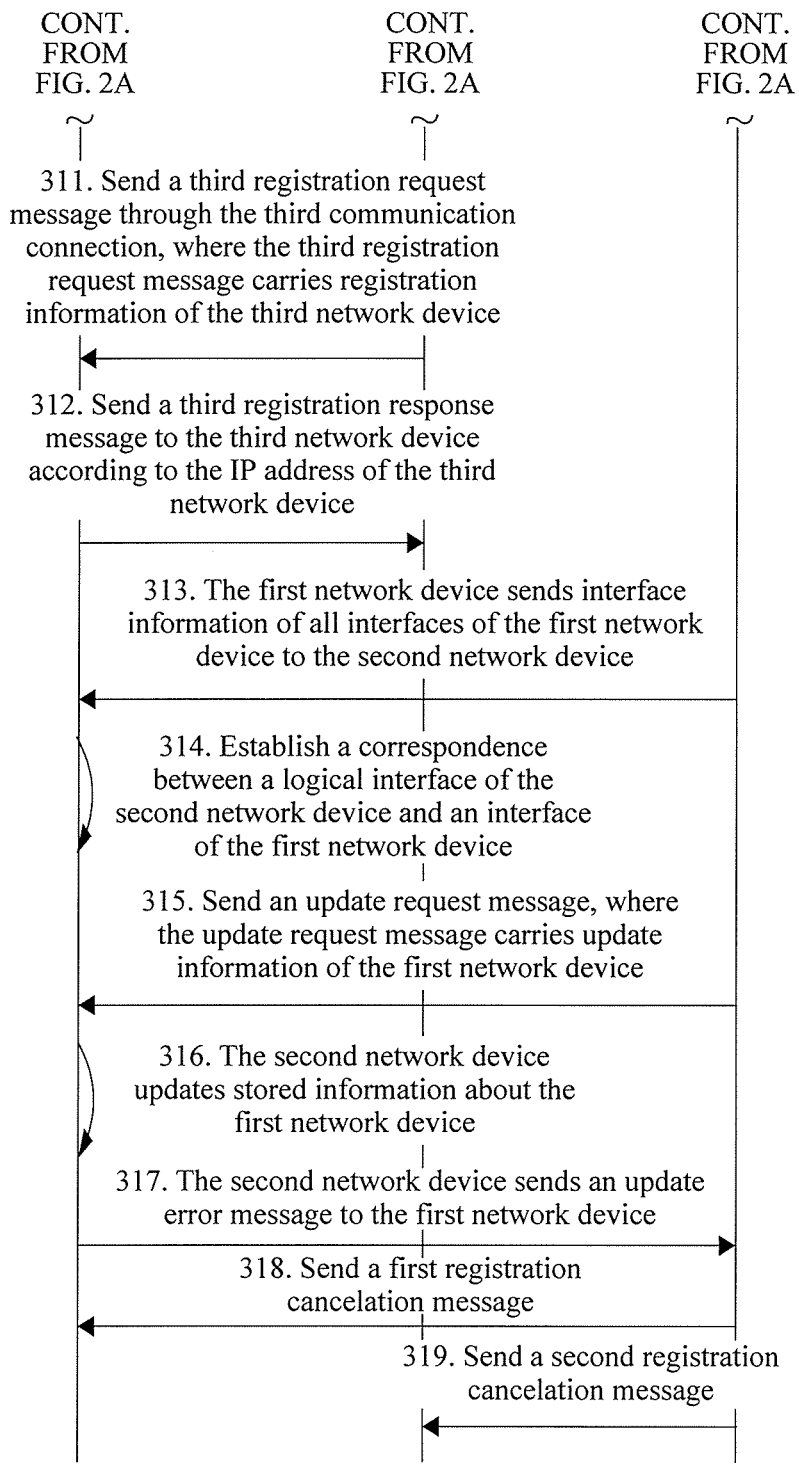

Referring to FIG. 3A and FIG. 3B, an embodiment of the present invention provides a schematic diagram of signaling interaction of a virtual cluster establishment method. The signaling diagram of this embodiment only shows processing steps included in the method, but poses no limitation on a sequence of executing the steps. As shown in FIG. 3A and FIG. 3B, the method may include:

301: A first network device, a second network device, and a third network device are separately configured to enter a virtual cluster running mode, and separately acquire a running role.

The first network device, the second network device, and the third network device may enter the virtual cluster running mode by means of configuration. When not configured to enter the virtual cluster running mode, the first network device, the second network device, and the third network device may be common network devices; and when the first network device, the second network device, and the third network device enter the virtual cluster running mode, it indicates that these network devices may be used as members of the virtual cluster to work in the virtual cluster. A manner of configuring the running mode in this embodiment may be implemented by configuring a command line or by executing a configuration file.

After the first network device, the second network device, and the third network device enter the cluster running mode, a running role of each network device in the virtual cluster further needs to be separately set. The first network device is configured as a slave node device, the second network device as an active main control device, and the third network device as a standby main control device. After this step is performed, the network devices form a virtual cluster, and a running role of each network device in the virtual cluster is separately set. In specific implementation, for example, to add a new network device to the virtual cluster, the newly added network device may be configured to enter a virtual cluster running mode; and a running role of the newly added network device may be configured, which facilitates extension of the virtual cluster. In the same way, if a network device in the virtual cluster needs to be deleted from the virtual cluster, the network device may be configured to cancel the virtual cluster running mode and cancel the running role also in the foregoing manner of a command line or a configuration file.

302: The first network device, the second network device, and the third network device acquire their IP addresses.

Specifically, the IP addresses of the first network device, the second network device, and the third network device may be obtained by pre-configuration, or may be dynamically obtained by running the Dynamic Host Configuration Protocol (Dynamic Host Configuration Protocol, DHCP for short). Manners for acquiring an IP address of each network device may be the same or may be different.

303: The first network device acquires the IP addresses of the second network device and the third network device.

A manner of acquiring, by the first network device, the IP addresses of the second network device and the third network device may be obtained by means of configuration, that is, after obtaining their IP addresses, the second network device and the third network device configure their IP addresses on the first network device by using a command line or a configuration file; alternatively, the IP addresses of the second network device and the third network device may also be sent to the first network device by a network management device by using the DHCP protocol. For example, the IP addresses of the second network device and the third network device are obtained by using the DHCP protocol, and therefore, when the network management device allocates corresponding IP addresses to the second network device and the third network device by using the DHCP protocol, the network management device may also send these IP addresses to the first network device, so that the first network device obtains the IP addresses of the second network device and the third network device.

304: The first network device establishes a network-layer-based first communication connection with the second network device.

The first network device may initiate establishment of the first communication connection to the second network device according to the IP address of the second network device, where the first communication connection may be established by using a method such as the ICCP, or the TCP, or the UDP, or the IP, and all subsequent messages sent between the first network device and the second network device are carried over the first communication connection.

305: The first network device establishes a network-layer-based second communication connection with the third network device.

The second communication connection may be established by using a method such as the ICCP, or the TCP, or the UDP, or the IP, and all subsequent messages sent between the first network device and the third network device are carried over the second communication connection.

306: The first network device sends a first registration request message to the second network device through the first communication connection, where the first registration request message is used to request that the first network device and the second network device establish a virtual cluster.

The first network device sends a first registration request message to the second network device through the first communication connection established between the first network device and the second network device, where the first registration request message carries registration information of the first network device, and the registration information may include the IP address of the first network device, an ESN, label space, the IP address of the third network device, and the like.

307: The second network device sends a first registration response message to the first network device.

The second network device stores the registration information that is of the first network device and in the first registration request message received in 306, which is used to process a service running process after the virtual cluster establishment is complete. In addition, after the second network device receives the first registration request message of the first network device, the second network device receives, after the second network device and the first network device establish the virtual cluster, the first registration response message sent to the first network device. If the second network device does not receive a registration request of the first network device, the second network device may also send a registration request failure message to the first network device.

After receiving the first registration response message sent by the second network device, where the first registration response message indicates that the virtual cluster is successfully established, the first network device selects the second network device as an active main control device of the first network device in the virtual cluster.

308: The first network device sends a second registration request message to the third network device, where the second registration request message is used to request the third network device to join the virtual cluster.

The second registration request message sent by the first network device to the third network device carries the registration information of the first network device, where the registration information may further include the IP address of the second network device, so that, after obtaining the IP address of the second network device, the third network device may execute a procedure of establishing a communication connection with the second network device in 310 step. In addition, a manner of acquiring the IP address of the second network device by the third network device may be: sending, by the network management device, the IP address of the second network device to the third network device by using the DHCP protocol.

309: The third network device sends a second registration response message to the first network device.

The second registration response message is used to notify the first network device that the third network device already joins the virtual cluster; and after receiving the second registration response message, the first network device selects the third network device as a standby main control device of the first network device in the virtual cluster. After determining that the third network device is the standby main control device of the first network device, the first network device does not receive a forwarding table sent by the third network device, and only after the third network device upgrades to the active main control device of the first network device, the first network device begins to receive the forwarding table sent by the third network device.

310: The third network device establishes a third communication connection with the second network device.

After receiving the second registration request message sent by the first network device, the third network device may establish, according to the IP address of the second network device carried in the second registration request message in 308, the network-layer-based third communication connection with the second network device. In this way, the second network device may send an external forwarding table of the virtual cluster to the third network device through the third communication connection.

311: The third network device sends a third registration request message to the second network device through the third communication connection, where the third registration request message carries registration information of the third network device.

312: The second network device sends a third registration response message to the third network device according to the IP address of the third network device.

313: The first network device sends interface information of all interfaces of the first network device to the second network device.

After establishing the first communication connection with the second network device, the first network device reports interface information to the second network device, so that the second network device may establish a binding relationship between a logical interface and the interface information of the first network device, and manage interfaces on the first network device. The interface information reported by the first network device includes: an interface index, an interface name, and an interface parameter.

314: The second network device establishes a correspondence between a logical interface of the second network device and an interface of the first network device.

On the second network device, a correspondence between a logical interface and the foregoing interface information that is reported by the first network device may be established, and an interface of the second network device may be managed and maintained according to the correspondence, where the correspondence may be implemented in a manner of a command line, for example:

an Interface logical interface name;

a Binding device ID interface name, where the device ID may use the IP address of the first network device or another identifier that can represent the first network device.

315: The first network device sends an update request message to the second network device, where the update request message carries update information of the first network device.

When some basic information of the first network device is updated, the first network device sends an update message including updated information to the second network device, and the second network device updates related information. For example, when the interface information of the first network information changes, the first network device may report updated interface information to the second network device.

316: The second network device updates stored information about the first network device.

If an error occurs when the second network device stores the update information in the update request message, for example, due to a reason, it is determined that received update information is incorrect, or an error occurs when the information is stored, the second network device proceeds to execute 317 step.

317: The second network device sends an update error message to the first network device.

After receiving the update error message, the first network device learns that an error occurs when the second network device updates information, and then the first network device may send an update request message to the second network device again.

Further, if the first network device re-plans a virtual cluster, or exits the virtual cluster, that is, the first network device is configured to cancel the virtual cluster running mode, and then the first network device may further proceed to execute 318 step.

318: The first network device sends a first registration cancelation message to the second network device.

When exiting the virtual cluster, the first network device sends the first registration cancelation message to the second network device. After receiving the first registration cancelation message sent by the first network device, the second network device ends the first communication connection to the first network device, and deletes various registration information of the first network device that is stored in the second network device.

319: The first network device sends a second registration cancelation message to the third network device.

When exiting the virtual cluster, the first network device further sends the second registration cancelation message to the third network device, and the third network device also ends the second communication connection to the first network device.

It can be seen that, in the virtual cluster establishment method in this embodiment of the present invention, the network devices in the virtual cluster establish the virtual cluster in a manner of a network-layer-based communication connection. In this manner, establishment of a cluster is flexible, which simplifies a structure of the cluster and also reduces a system cost. In addition, in this manner, scalability of the cluster is improved.

Figure 4:
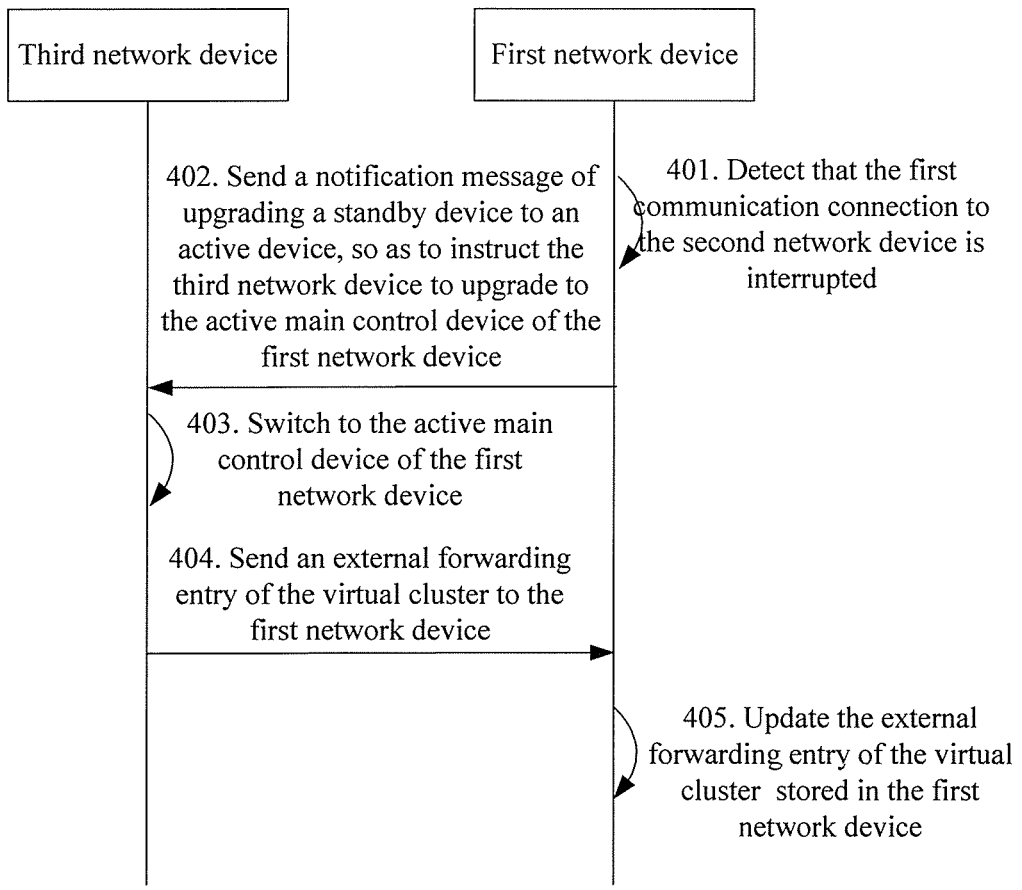
FIG. 4 is a schematic diagram of signaling interaction of another virtual cluster establishment method according to an embodiment of the present invention.

Referring to FIG. 4, an embodiment of the present invention provides a schematic diagram of signaling interaction of another virtual cluster establishment method. In this embodiment of the present invention, based on the signaling interaction of the virtual cluster establishment method as shown in FIG. 3A and FIG. 3B, a procedure that switching occurs between the second network device and the third network device after the virtual cluster is established and the second network device is faulty is described. Signaling interaction when switching occurs between the second network device and the third network device includes the following steps:

401: The first network device detects that the first communication connection to the second network device is interrupted.

A reason for ending the first communication connection may be that: the second network device is faulty, for example, a reason that an entire device is restarted.

402: The first network device sends, to the third network device, a notification message of upgrading a standby device to an active device, so as to instruct the third network device to upgrade to the active main control device of the first network device.

403: The third network device switches to the active main control device of the first network device.

404: The third network device sends an external forwarding table of the virtual cluster to the first network device.

In this embodiment of the present invention, after the third network device is upgraded to the active main control device of the first network device, the third network device sends the external forwarding table of the virtual cluster to the first network device, so that the first network device can perform subsequent packet forwarding according to the external forwarding table of the virtual cluster.

405: The first network device updates an external forwarding table of the virtual cluster stored in the first network device.

The first network device upgrades, according to the external forwarding table of the virtual cluster that is sent by the third network device, an external forwarding table of the virtual cluster that is locally stored, and deletes an external forwarding table of the virtual cluster that is locally stored and is not updated, so as to ensure that the first network device executes a forwarding function according to a latest forwarding table.

It can be seen that, in the virtual cluster establishment method in this embodiment of the present invention, when the first network device detects that the first communication connection to the second network device is interrupted, the first network device sends a notification message to the third network device, where the notification message is used to instruct the third network device to upgrade to the active main control device of the first network device, thereby improving reliability of the virtual cluster.

Figure 5:
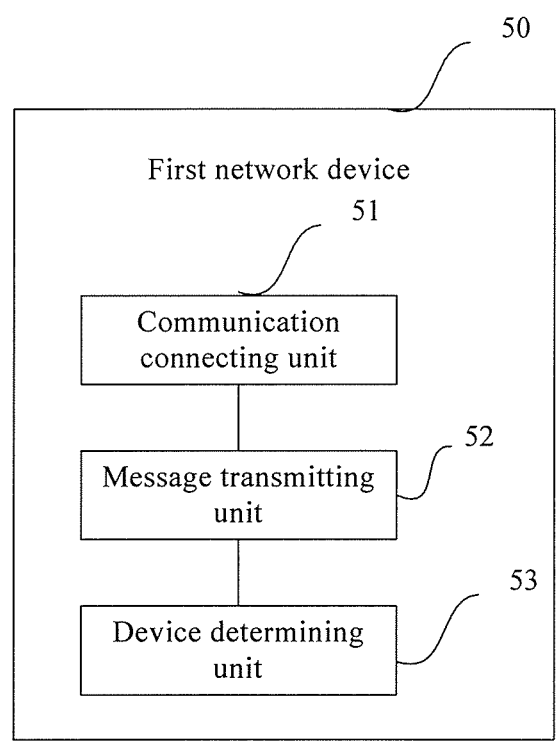
FIG. 5 is a schematic structural diagram of a first network device according to an embodiment of the present invention.

Referring to FIG. 5, an embodiment of the present invention provides a schematic structural diagram of a first network device 50, where the first network device 50 may execute the method in any one of the foregoing embodiments of the present invention. The first network device 50 includes: a communication connecting unit 51, a message transmitting unit 52, and a device determining unit 53; where the communication connecting unit 51 is configured to establish a network-layer-based first communication connection with a second network device, and configured to establish a network-layer-based second communication connection with a third network device;

the message transmitting unit 52 is configured to send a first registration request message to the second network device through the first communication connection, where the first registration request message is used to request establishment of a virtual cluster with the second network device; receive a first registration response message sent by the second network device, where the first registration response message indicates that the virtual cluster is successfully established; send a second registration request message to the third network device through the second communication connection, where the second registration request message is used to request the third network device to join the virtual cluster; and receive a second registration response message sent by the third network device; and the device determining unit 53 is configured to: after the message transmitting unit receives the first registration response message sent by the second network device, where the first registration response message indicates that the virtual cluster is successfully established, select the second network device as an active main control device of the first network device 50 in the virtual cluster system; and after the message transmitting unit receives the second registration response message sent by the third network device, select the third network device as a standby main control device of the network device itself in the virtual cluster.

The first communication connection may be established by using the ICCP, or the TCP, or the UDP, or the IP, and all subsequent messages exchanged between the first network device 50 and the second network device are carried over the first communication connection. The second communication connection may be established by using the ICCP, or the TCP, or the UDP, or the IP, and all subsequent messages exchanged between the first network device 50 and the third network device are carried over the second communication connection. A registration information may include: an IP address of the first network device 50, an electronic serial number (Electronic Serial Number, ESN for short), label space, and the like.

Optionally, the first communication connection established with the second network device passes through a fourth network device, where the fourth network device does not belong to the virtual cluster; or the second communication connection established with the third network device passes through a fifth network device, where the fifth network device does not belong to the virtual cluster. The first communication connection is a network-layer-based connection, and therefore, the virtual cluster establishment method is not limited to establishing a virtual cluster between network devices that are directly connected physically, and there is no requirement on a position in which a network device is located. For example, the first network device 50 is in Beijing, and the second network device is in Shenzhen; the first network device 50 and the second network device may form a virtual cluster as long as the network-layer-based first communication connection can be established between the first network device 50 and the second network device, thereby improving flexibility of virtual cluster establishment.

Figure 6:
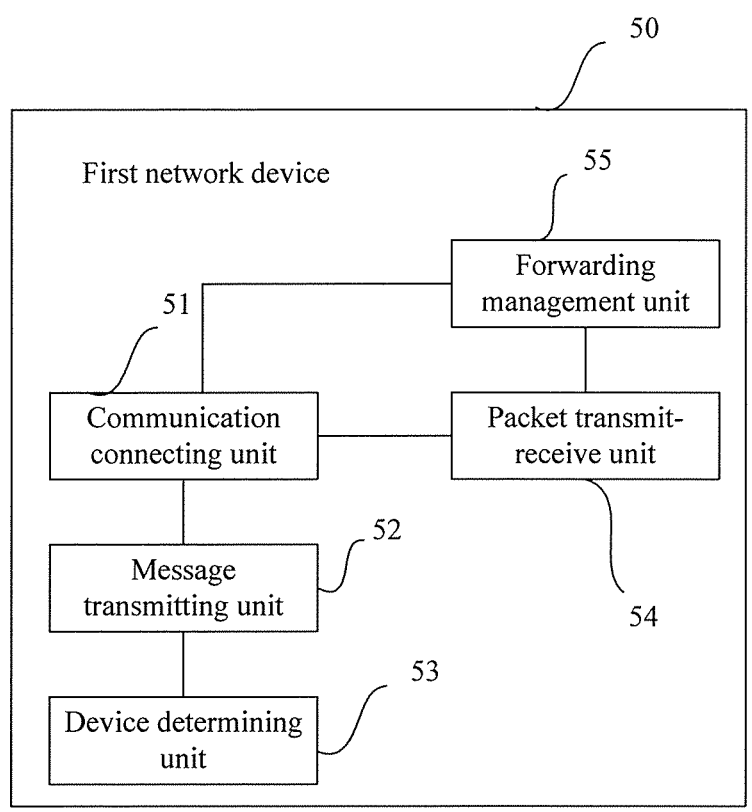
FIG. 6 is a schematic structural diagram of another first network device according to an embodiment of the present invention.

Referring to FIG. 6, based on the first network device 50 shown in FIG. 5, an embodiment of the present invention further provides a schematic structural diagram of another first network device 50. The first network device 50 may further include a packet transmit-receive unit 54; where the packet transmit-receive unit 54 is configured to forward a control protocol packet received from a network device outside the virtual cluster to the second network device through the first communication connection, so that the second network device generates an external forwarding table of the virtual cluster according to the control protocol packet; and receive the external forwarding table of the virtual cluster that is sent by the second network device.

Optionally, the second registration request message sent by the message transmitting unit 52 to the third network device includes an address of the second network device, so that, after receiving the second registration request message, the third network device establishes a network-layer-based third communication connection with the second network device according to the address of the second network device, where the third communication connection is used to send the external forwarding table of the virtual cluster to the third network device by the second network device through the third communication connection.

After the first network device 50 and the second network device establishes the virtual cluster, the virtual cluster is externally embodied as one network device, and the second network device manages the virtual cluster; the first network device 50 sends the control protocol packet received from the network device outside the virtual cluster to the second network device, where the second network device is responsible for generating the external forwarding table of the virtual cluster, and delivering the forwarding table to the first network device, and the control protocol packet may be an Interior Gateway Protocol (interior Gateway Protocols, IGP for short) packet, a Border Gateway Protocol (Border Gateway Protocol, BGP for short) packet, or the like.

Optionally, the message transmitting unit 52 is further configured to: when the first network device 50 detects that the first communication connection to the second network device is interrupted, send a notification message to the third network device, where the notification message is used to instruct the third network device to upgrade to the active main control device of the first network device.

Optionally, the first network device 50 further includes: a forwarding management unit 55, configured to receive the external forwarding table of the virtual cluster that is sent by the third network device; update, according to the external forwarding table of the virtual cluster that is sent by the third network device, an external forwarding table of the virtual cluster that is locally stored in the first network device 50, and delete an external forwarding table of the virtual cluster that is locally stored and is not updated.

Optionally, the first network device 50 may be a router, or a switch, or a network device with a function of network layer forwarding.

Optionally, the communication connecting unit 51, the message transmitting unit 52, the device determining unit 53, and the packet transmit-receive unit 54 may be integrated into one or more units.

It can be seen that, the first network device 50 establishes a network-layer-based communication connection separately with the second network device and the third network device, and sends a registration request message based on the communication connection, so that the first network device 50 establishes a virtual cluster with the second network device and the third network device, not requiring a connection by using special hardware in the prior art, thereby simplifying a structure of a cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

Figure 7:
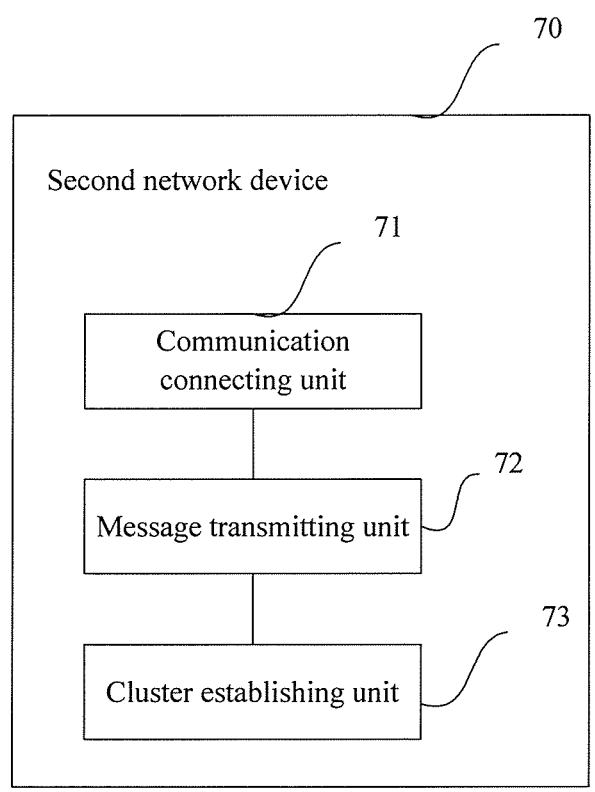
FIG. 7 is a schematic structural diagram of a second network device according to an embodiment of the present invention.

Referring to FIG. 7, an embodiment of the present invention further provides a schematic structural diagram of a second network device 70, where the second network device 70 may execute the method of any one of the embodiments of the present invention. The first network device 70 includes: a communication connecting unit 71, a message transmitting unit 72, and a cluster establishing unit 73; where the communication connecting unit 71 is configured to establish a network-layer-based first communication connection with a first network device, and establish a network-layer-based third communication connection with a third network device;

the message transmitting unit 72 is configured to receive a first registration request message that is sent through the first communication connection by the first network device; and receive a third registration request message that is sent through the third communication connection by the third network device; and the cluster establishing unit 73 is configured to establish a virtual cluster with the first network device and the third network device according to the first registration request message and the third registration request message; the second network device 70 is used as an active main control device of the first network device in the virtual cluster, and the third network device is used as a standby main control device of the first network device in the virtual cluster.

Optionally, the network-layer-based first communication connection established with the first network device passes through a fourth network device, where the fourth network device does not belong to the virtual cluster.

Figure 8:
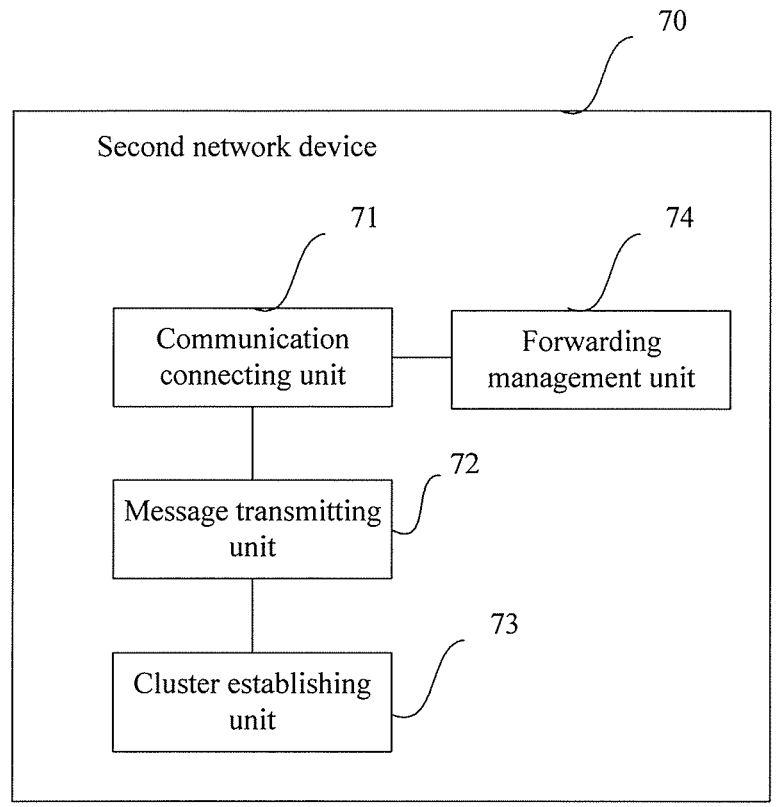
FIG. 8 is a schematic structural diagram of another second network device according to an embodiment of the present invention.

Referring to FIG. 8, based on the second network device 70 shown in FIG. 7, an embodiment of the present invention further provides a schematic structural diagram of another second network device 70, where the second network device 70 further includes:

a forwarding management unit 74, configured to receive a control protocol packet that is sent through the first communication connection by the first network device, where the control protocol packet is received by the first network device from a network device outside the virtual cluster; and generate an external forwarding table of the virtual cluster according to the control protocol packet, and send the forwarding table to the first network device.

Optionally, the second network device 70 may be a router, or a switch, or a network device with a function of network layer forwarding.

Optionally, the communication connecting unit 71, the message transmitting unit 72, the cluster establishing unit 73, and the forwarding management unit 74 may be integrated into one or more units.

It can be seen that, the second network device 70 establishes a network-layer-based communication connection separately with the first network device and the third network device, receives, based on the communication connection, a registration request message sent by the first network device and the third network device separately, and establishes a virtual cluster with the first network device and the third network device, not requiring a connection by using special hardware in the prior art, thereby simplifying a structure of the virtual cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

Figure 9:
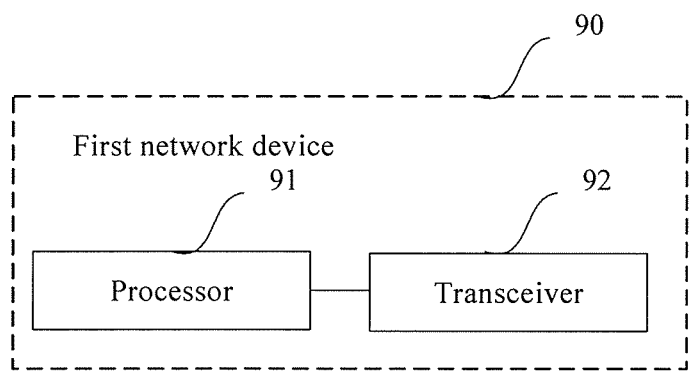
FIG. 9 is a schematic structural diagram of still another first network device according to an embodiment of the present invention.

Referring to FIG. 9, an embodiment of the present invention provides a schematic structural diagram of still another first network device 90, where the first network device 90 may execute the method of any one of the foregoing embodiments of the present invention. The first network device 90 includes: a processor 91 and a transceiver 92; where the processor 91 is configured to establish a network-layer-based first communication connection with a second network device, and configured to establish a network-layer-based second communication connection with a third network device;

the transceiver 92 is configured to send a first registration request message to the second network device through the first communication connection established by the processor 91, where the first registration request message is used to request establishment of a virtual cluster with the second network device; receive a first registration response message sent by the second network device, where the first registration response message indicates that the virtual cluster is successfully established; send a second registration request message to the third network device through the second communication connection established by the processor 91, where the second registration request message is used to request the third network device to join the virtual cluster; and receive a second registration response message sent by the third network device; and the processor 91 is further configured to: after the transceiver 92 receives the first registration response message sent by the second network device, where the first registration response message indicates that the virtual cluster is successfully established, select the second network device as an active main control device of the network device 90 in the virtual cluster system; and after the transceiver 92 receives the second registration response message sent by the third network device, select the third network device as a standby main control device of the network device itself in the virtual cluster.

Optionally, the first communication connection established with the second network device passes through a fourth network device, where the fourth network device does not belong to the virtual cluster; or the second communication connection established with the third network device passes through a fifth network device, where the fifth network device does not belong to the virtual cluster.

Optionally, the transceiver 92 is further configured to forward a control protocol packet received from a network device outside the virtual cluster to the second network device through the first communication connection, so that the second network device generates an external forwarding table of the virtual cluster according to the control protocol packet; and receive the external forwarding table of the virtual cluster that is sent by the second network device.

Optionally, the second registration response message sent by the transceiver 92 to the third network device includes an address of the second network device, so that, after receiving the second registration request message, the third network device establishes a network-layer-based third communication connection with the second network device according to the address of the second network device, where the third communication connection is used to send the external forwarding table of the virtual cluster to the third network device by the second network device through the third communication connection.

Optionally, the transceiver 92 is further configured to: when the first network device detects that the first communication connection to the second network device is interrupted, send a notification message to the third network device, where the notification message is used to instruct the third network device to upgrade to the active main control device of the first network device; and the transceiver 92 is further configured to receive the external forwarding table of the virtual cluster that is sent by the third network device.

Optionally, the first network device 90 further includes:

a memory, where the memory is configured to store the forwarding table received by the transceiver 92; and the processor 91 is configured to: update, according to the external forwarding table of the virtual cluster that is sent by the third network device, an external forwarding table of the virtual cluster that is locally stored in the first network device 90, and delete an external forwarding table of the virtual cluster that is locally stored and is not updated.

Optionally, the first network device 90 may be a router, or a switch, or a network device with a function of network layer forwarding.

Optionally, the processor 91 may be a central processing unit (Central Processing Unit, CPU for short). The transceiver 92 may include a common physical interface, where the physical interface may be an Ethernet interface or an asynchronous transfer mode (Asynchronous Transfer Mode, ATM for short) interface. The processor and the transceiver 92 may be integrated into one or more independent circuits or hardware, for example, an application specific integrated circuit (Application Specific Integrated Circuit, ASIC for short).

Figure 10:
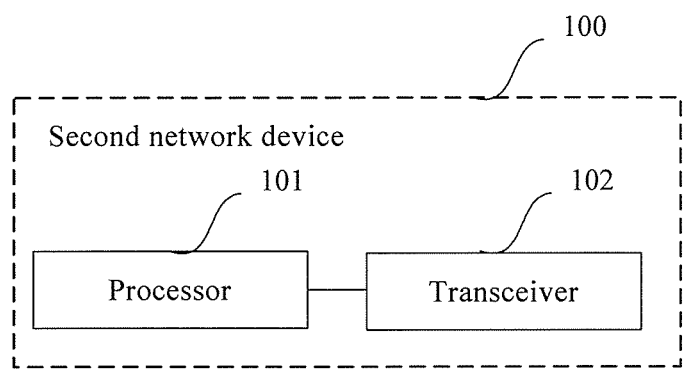
FIG. 10 is a schematic structural diagram of still another second network device according to an embodiment of the present invention.

Referring to FIG. 10, an embodiment of the present invention further provides a schematic structural diagram of still another second network device 100, where the second network device 100 may execute the method of any one of the embodiments of the present invention. The second network device 100 includes: a processor 101 and a transceiver 102; where the processor 101 is configured to establish a network-layer-based first communication connection with a first network device, and establish a network-layer-based third communication connection with a third network device;

the transceiver 102 is configured to receive a first registration request message that is sent through the first communication connection by the first network device; and receive a third registration request message that is sent through the third communication connection by the third network device; and the processor 101 is configured to establish a virtual cluster with the first network device and the third network device according to the first registration request message and the third registration request message; the second network device 100 is used as an active main control device of the first network device in the virtual cluster, and the third network device is used as a standby main control device of the first network device in the virtual cluster.

Optionally, the network-layer-based first communication connection established with the first network device passes through a fourth network device, where the fourth network device does not belong to the virtual cluster.

Optionally, the second network device 100 further includes a memory;

the transceiver 102 is further configured to receive a control protocol packet that is sent through the first communication connection by the first network device, where the control protocol packet is received by the first network device from a network device outside the virtual cluster; and the processor 101 generates an external forwarding table of the virtual cluster according to the control protocol packet, the memory stores the forwarding table, and the transceiver 102 sends the forwarding table to the first network device.

Optionally, the second network device 100 may be a router, or a switch, or a network device with a function of network layer forwarding.

Optionally, the processor 101 may be a CPU. The transceiver 102 may include a common physical interface, where the physical interface may be an Ethernet interface or an ATM interface. The processor 101 and the transceiver 102 may be integrated into one or more independent circuits or hardware, for example, an ASIC.

It can be seen that, the second network device 100 establishes a network-layer-based communication connection separately with the first network device and the third network device, receives, based on the communication connection, a registration request message sent by the first network device and the third network device separately, and establishes a virtual cluster with the first network device and the third network device, not requiring a connection by using special hardware in the prior art, thereby simplifying a structure of the virtual cluster. In addition, because an active main control device and a standby main control device exist in the virtual cluster, reliability of the virtual cluster is improved. Further, in this manner, when a network changes and a new network device needs to be added to the virtual cluster, the newly added network device may easily connect to the virtual cluster in the foregoing manner, and is well adapted to a change of a network scale, thereby improving scalability of the virtual cluster.

"First" in the first network device, the first registration request message, the first communication connection, and the first registration response message mentioned in the embodiments of the present invention is merely used for identifying a name and does not represent the first in a sequence. "Second" in the second network device, the second registration request message, the second communication connection, and the second registration response message is merely used for identifying a name and does not represent the second in a sequence.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A virtual cluster establishment method, comprising:
   establishing, by a first network device, a network-layer-based first communication connection with a second network device;
   sending, by the first network device, a first registration request message to the second network device through the network-layer-based first communication connection for establishing a virtual cluster comprising the first network device and the second network device, wherein the first registration request message carries registration information of the first network device;
   after the first network device receives a first registration response message sent by the second network device for indicating that the virtual cluster is successfully established, selecting the second network device as an active main control device of the first network device in the virtual cluster;
   establishing, by the first network device, a network-layer-based second communication connection with a third network device;
   sending, by the first network device, a second registration request message to the third network device through the network-layer-based second communication connection for requesting the third network device to join the virtual cluster;
   after the first network device receives a second registration response message sent by the third network device, selecting, by the first network device, the third network device as a standby main control device of the first network device in the virtual cluster;
   wherein selecting the second network device as an active main control device of the first network device in the virtual cluster system comprises:
      forwarding, by the first network device, a control protocol packet received from a network device outside the virtual cluster to the second network device through the network-layer-based first communication connection to enable the second network device to generate an external forwarding table of the virtual cluster according to the control protocol packet; and receiving, by the first network device, the external forwarding table of the virtual cluster that is sent by the second network device.

2. The method according to claim 1, wherein:

the network-layer-based first communication connection established by the first network device with the second network device passes through a fourth network device, wherein the fourth network device does not belong to the virtual cluster; or the network-layer-based second communication connection established by the first network device with the third network device passes through a fifth network device, wherein the fifth network device does not belong to the virtual cluster.

3. The method according to claim 1, wherein the second registration request message sent by the first network device comprises an address of the second network device, to enable, after receiving the second registration request message, the third network device to establish a network-layer-based third communication connection with the second network device according to the address of the second network device, for sending the external forwarding table of the virtual cluster to the third network device by the second network device.

4. The method according to claim 1, further comprising:

when the first network device detects that the network-layer-based first communication connection to the second network device is interrupted, sending a notification message to the third network device for instructing the third network device to upgrade to the active main control device of the first network device.

5. The method according to claim 4, further comprising:

receiving, by the first network device, the external forwarding table of the virtual cluster sent by the third network device; and updating, by the first network device and according to the external forwarding table of the virtual cluster sent by the third network device, an external forwarding table of the virtual cluster that is locally stored in the first network device, and deleting an external forwarding table of the virtual cluster that is locally stored and is not updated.

6. A virtual cluster establishment method, comprising:

establishing, by a second network device, a network-layer-based first communication connection with a first network device;

establishing, by the second network device, a network-layer-based third communication connection with a third network device;

receiving, by the second network device, a first registration request message sent through the network-layer-based first communication connection by the first network device, wherein the first registration request message carries registration information of the first network device;

receiving, by the second network device, a third registration request message sent through the network-layer-based third communication connection by the third network device;

establishing, by the second network device, a virtual cluster comprising the second network device, the first network device and the third network device according to the first registration request message and the third registration request message, wherein the second network device is used as an active main control device of the first network device in the virtual cluster, and the third network device is used as a standby main control device of the first network device in the virtual cluster; and wherein using the second network device as an active main control device of the first network device in the virtual cluster system comprises:

receiving, by the second network device, a control protocol packet that is sent through the network-layer-based first communication connection by the first network device, wherein the control protocol packet is received by the first network device from a network device outside the virtual cluster; and generating, by the second network device, an external forwarding table of the virtual cluster according to the control protocol packet, and sending the forwarding table to the first network device.

7. The method according to claim 6, wherein the network-layer-based first communication connection established by the second network device with the first network device passes through a fourth network device, wherein the fourth network device does not belong to the virtual cluster.

8. The method according to claim 6, further comprising:

when the network-layer-based first communication connection between the second network device and the first network device is interrupted, upgrading the third network device to the active main control device of the first network device in the virtual cluster.

9. A first network device, comprising:

a processor, configured to establish a network-layer-based first communication connection with a second network device, and configured to establish a network-layer-based second communication connection with a third network device;

a transceiver, configured to:

send a first registration request message to the second network device through the network-layer-based first communication connection for establishing a virtual cluster comprising the first network device and the second network device, wherein the first registration request message carries registration information of the first network device, receive a first registration response message sent by the second network device, wherein the first registration response message indicates that the virtual cluster is successfully established, send a second registration request message to the third network device through the network-layer-based second communication connection for requesting the third network device to join the virtual cluster, and receive a second registration response message sent by the third network device; and wherein the processor is configured to:

after the transceiver receives the first registration response message sent by the second network device for indicating that the virtual cluster is successfully established, select the second network device as an active main control device of the first network device in the virtual cluster system; and after the transceiver receives the second registration response message sent by the third network device, select the third network device as a standby main control device of the first network device itself in the virtual cluster;

wherein the transceiver is further configured to:
forward a control protocol packet received from a network device outside the virtual cluster to the second network device through the network-layer-based first communication connection to enable the second network device to generate an external forwarding table of the virtual cluster according to the control protocol packet; and
receive the external forwarding table of the virtual cluster that is sent by the second network device.

10. The first network device according to claim 9, wherein:
the network-layer-based first communication connection established with the second network device passes through a fourth network device, wherein the fourth network device does not belong to the virtual cluster; or
the network-layer-based second communication connection established with the third network device passes through a fifth network device, wherein the fifth network device does not belong to the virtual cluster.

11. The first network device according to claim 9, wherein:
the second registration request message sent by the transceiver to the third network device comprises an address of the second network device to enable, after receiving the second registration request message, the third network device to establish a network-layer-based third communication connection with the second network device according to the address of the second network device for sending the external forwarding table of the virtual cluster to the third network device by the second network device through the network-layer-based third communication connection.

12. The first network device according to claim 9, wherein:
the transceiver is further configured to: when the first network device detects that the network-layer-based first communication connection to the second network device is interrupted, send a notification message to the third network device for instructing the third network device to upgrade to the active main control device of the first network device.

13. The first network device according to claim 12, wherein the transceiver is further configured to:
receive the external forwarding table of the virtual cluster that is sent by the third network device; and
the processor is further configured to:
update, according to the external forwarding table of the virtual cluster that is sent by the third network device, an external forwarding table of the virtual cluster that is locally stored in the first network device, and
delete an external forwarding table of the virtual cluster that is locally stored and is not updated.

14. A second network device, comprising:
a processor, configured to:
establish a network-layer-based first communication connection with a first network device, and
establish a network-layer-based third communication connection with a third network device;
a transceiver, configured to:
receive a first registration request message that is sent through the network-layer-based first communication connection by the first network device, wherein the first registration request message carries registration information of the first network device, and
receive a third registration request message that is sent through the network-layer-based third communication connection by the third network device;
wherein the processor is further configured to establish a virtual cluster comprising the second network device, the first network device and the third network device according to the first registration request message and the third registration request message, wherein the second network device is used as an active main control device of the first network device in the virtual cluster, and the third network device is used as a standby main control device of the first network device in the virtual cluster;
wherein the transceiver is further configured to:
receive a control protocol packet that is sent through the network-layer-based first communication connection by the first network device, wherein the control protocol packet is received by the first network device from a network device outside the virtual cluster;
the processor is further configured to generate an external forwarding table of the virtual cluster according to the control protocol packet; and
the transceiver is further configured to send the forwarding table to the first network device.

15. The second network device according to claim 14, wherein the network-layer-based first communication connection established with the first network device passes through a fourth network device, wherein the fourth network device does not belong to the virtual cluster.

* * * * *